United States Patent
Brisbane et al.

(10) Patent No.: US 9,831,485 B2
(45) Date of Patent: Nov. 28, 2017

(54) HIGH CURRENT ELECTRICAL JOINT THAT ELIMINATES PARTIAL ASSEMBLY

(71) Applicant: GM Global Technology Operations LLC, Detroit, MI (US)

(72) Inventors: Roger M. Brisbane, Washington, MI (US); Andrew P. Oury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 14/685,642

(22) Filed: Apr. 14, 2015

(65) Prior Publication Data

US 2016/0308344 A1    Oct. 20, 2016

(51) Int. Cl.
  *H01M 2/30* (2006.01)
  *B60L 11/18* (2006.01)
  *H01M 2/10* (2006.01)

(52) U.S. Cl.
  CPC .............. *H01M 2/305* (2013.01); *B60L 11/18* (2013.01); *H01M 2/1077* (2013.01); *H01M 2220/20* (2013.01)

(58) Field of Classification Search
  None
  See application file for complete search history.

(56) References Cited

U.S. PATENT DOCUMENTS

2006/0246350 A1\* 11/2006 Takayama ............. B60L 3/0046
                                                           429/178
2012/0231324 A1     9/2012 Brisbane

FOREIGN PATENT DOCUMENTS

JP             2014130740 A  \*  7/2014  ............... H01R 4/10

OTHER PUBLICATIONS

JP2014-130740A EN translation, 2014.\*

\* cited by examiner

*Primary Examiner* — Lucas J. O'Donnell
(74) *Attorney, Agent, or Firm* — Quinn IP Law

(57) ABSTRACT

An electric joint formed between a high current source and a high current load, and a method of making electrical connection between them. In one form, the source is made up of one or more cells in a battery pack and the load is an electric motor. An electrical connection assembly includes a first conductor, a fastener and a second conductor joined together such that electrical continuity between the conductors is not established until the fastener imparts a substantially normal force to both of them in such a way that they become secured together to produce a deformable shape to adjacently-facing surfaces one or both conductors, thereby ensuring significant contact and a related low electrical resistance as a way to avoid imperfect or partial attachments at the joint.

20 Claims, 7 Drawing Sheets

HIGH CURRENT ELECTRICAL JOINT THAT ELIMINATES PARTIAL ASSEMBLY

BACKGROUND OF THE INVENTION

This invention relates generally to a connecting strategy for batteries and other high current electrical joints, and more particularly to establishing a high current connection between a high current source and a high current load that are used for vehicular and related transportation applications such that partial assembly operations associated with such connection are avoided.

Lithium-ion and related batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells. One common vehicular form of the battery pack is known as a power battery, while another is known as an energy battery.

In one form, the individual cells that make up a battery pack are configured as rectangular (i.e., prismatic) cans that define a rigid outer housing known as a cell case. These types of cells are generally assembled into the power battery pack variant. In another form, the individual cells are housed in a thinner, flexible rectangular pouch that are generally assembled into the energy battery pack variant. Both cell types can be placed in a facing arrangement (much like a deck of cards) along a stacking axis formed by the aligned parallel plate-like surfaces. Positive and negative terminals situated on one edge on the exterior of the housing of each cell are laterally-spaced from one another to act as electrical contacts for connection (via busbar, for example) to an outside load or circuit. With particular regard to the prismatic can, numerous individual alternating positive and negative electrodes are spaced apart from one another within the can along the stacking direction and kept electrically isolated by non-conductive separators. Leads from each of the negative electrodes are gathered together inside the housing to feed the externally-projecting negative terminal, while leads from each of the positive electrodes are likewise gathered together to feed the externally-projecting positive terminal.

In a traditional electrical connection approach for cells in a battery pack, a connecting ring is placed over a stationary stud or related post-like anchoring location that is electrically coupled to one or more connectors that are joined to the respective anode or cathode tabs that extend from each aligned cell within a group of battery cells. The stud and ring act as an electrical joint between the individual cell tabs and the conductive path that is used to deliver the current to the electric motor or related load. During battery pack assembly, electric connection is established immediately upon the placement of the ring over the stud; this situation is known as partial assembly. To complete the connection, a threaded nut or related cap is coupled to the stud to ensure relative permanence of the connection between the mating surfaces formed at the joint.

This partial assembly approach has a tendency to produce a loose bolted connection, which in turn leads to high resistance electrical joints; these tend to be very hard to detect. One factor contributing to the increased joint resistance is a lack of adequate force to promote secure contact between the joined components of the partial assembly. Another is a lack of adequate surface area; this latter shortcoming reduces the size of the flowpath through which the current may pass such that in places where such flowpath is established, which in turn leads to increased localized heating. In some cases, the heat is sufficient to cause degradation of coatings, which further increases joint resistance and ultimately can lead to overheating of the joint, where further damage (such as to adjacent plastic components) may ensue. Extensive quality or diagnostic checks may help reduce the occurrence of such high-resistance joining at the point of manufacture. Such diagnostic techniques (which may require thermal images to be taken during periods of high current flow through the connected region to determine the resistance of the assembled joints) add considerable complexity and related expense to the assembly process. Moreover, there are no known methods to perform such diagnostics at post-manufacturing locations, such as those involved in the repair or related service to the battery cells and packs.

While most of the subsequent discussion is focused on high current joints used for batteries in general and automotive battery applications in particular, the invention disclosed herein may be equally applied to other high current joints, including those used for electric motors, controllers or the like, as well as those used as ancillary battery equipment. For example, a joint that is formed in a battery disconnect unit (BDU) could also benefit from reduced reliance on partial assembly and its attendant difficulties.

SUMMARY OF THE INVENTION

In accordance with one aspect of the present invention, an assembly for electrically connecting a high current source to a load at a joint is disclosed. In particular, the various embodiments of the present invention integrate several methods to eliminate the potential to partially assemble threaded high current electrical joints. This is achieved by eliminating the conductive stud of the conventional approaches discussed above such that the electrical connection (and concomitant high current flow) is not established until a fastener is added and secured into position in such a way that it causes the structure that makes up at least one of the two current-conducting flowpaths to deform (such as by bending under the influence of the fastener) until electrical contact is established between the two conductors. This requirement to cause significant deformation avoids the potential for an electrical joint with a missing or improperly-secured nut. A significant benefit is that it eliminates high resistance joints that cause extreme heat when used as part of a high current application (such as that associated with automotive battery packs).

In the present context, the term "secure" and its variants is meant to be more restrictive than the pedestrian meaning in that it encompasses those joint-forming configurations where the fastener imparts enough force (for example, a force normal to the surfaces) to ensure significant face-toface contact between the adjacent surfaces of the conductors that make up the current-conducting flowpaths. As such, neither mere contact between the conductors and the fastener, nor partial threaded engagement that does not result in a significant normal force being applied to the joined conductors, is sufficient to qualify as forming a secure joint; instead, a secure electrical joint is only established when a degree of tightening concomitant with the fastener and joined conductor size, shape, material choice and related structural properties is imparted that is of sufficient normally-applied force relative to the conductor contact surfaces to cause the deformed face-to-face contact mentioned above. In one exemplary form for use in an automotive battery pack with a threaded fastener connection, this degree of tightening is preferably between about 8.5 Nm and 10.5 Nm of torque.

In addition to eliminating the stud, the present invention includes the use of nonconductive elements around the primary electric interface to eliminate the potential for incidental or partial contact with the primary electrical contact surface of the joint. Furthermore, the movement of the fastener is designed to require deflection in order to make primary contact. The deflection force required to make contact will eliminate the failure modes related to the low torque associated with partial assembly or only finger tight connections. Moreover, it reduces error proofing requirements that include steps taken to eliminate partial assembly of the joint or it is additional quality checks made to detect such partial assembly of the joint.

According to yet another aspect of the invention, an automotive battery pack is disclosed. It includes numerous battery cells, an enclosure disposed around the cells to act as a housing or related containment structure for the cells, and an electrical connection assembly that includes a first conductor, fastener and second conductor in a manner similar to that described above in conjunction with the previous aspect.

In the present disclosure, the term "battery" and its variants is understood to include individual battery cells (such as the prismatic-shaped cells mentioned above), as well as larger assemblies (such as modules, packs or the like) that are made up of such cells, and that reference to each as individual components or combinations involving such components will be apparent from the context. Likewise, while the term "battery pack" is used herein to discuss a substantially complete battery assembly for use in propulsive power and other high-power applications, it will be understood by those skilled in the art that related terms—such as "battery unit" or the like—may also be used to describe such an assembly, and that either term may be used interchangeably without a loss in such understanding. With regard to the individual battery cells, their prismatic construction facilitates their stacking or alignment within an enclosure such that upon placement of the stacked battery cells in the volume defined by the enclosure, a relative simple, straightforward conductive member that is formed in or on the enclosure cover can be securely connected to the busbar or current pathway such that current generated within the cells is delivered to the load.

In the present context, the battery pack is considered to be a substantially complete assembly or system of components necessary for propulsion of the vehicle for which the pack was designed, while battery modules and individual battery cells are (as mentioned above) considered to be subcomponents of the overall system. Likewise, an assembly of components for a battery pack used for vehicular applications may include—in addition to numerous battery cells— cooling plates, frames, trays, securing mechanisms and other equipment that, while not contributing to the production of electric power, form an important part of the overall battery system nonetheless.

According to yet another aspect of the invention, a method of making an electrical joint between a high current source and a high current load is disclosed. The method includes electrically coupling the source to a first conductor that defines a first conductive flowpath; electrically coupling the load to a second conductor that defines a second conductive flowpath and using a fastener to secure the two conductors to one another in such a way that electrical connection is established only upon deformation of at least one of the conductors under the influence of the fastener. In this way, partial assembly situations, including those involving incomplete or defective fastener joining approaches, are avoided. In a particular form, the method is for assembling an automotive battery pack. In this particular form, numerous battery cells are arranged into a stacked relationship with one another inside an enclosure such that at least a portion of the enclosure defines an electrically nonconductive mounting surface. The first conductor is situated on or in the mounting surface to establish electrical connectivity between the cells and the joint to be formed. The second conductor is placed adjacent to the first conductor so that a fastener can be used to secure the two conductors together through deformation of one or both. To achieve such deformation, the fastener is secured to both conductors (for example, through aligned apertures formed in both) such that upon suitable tightening or other fastening engagement, at least one of the corresponding conductors is bent or otherwise reshaped to promote a secure, relatively large common-area contact. In the present context, that a conductor is situated on or in the mounting surface of the enclosure encompasses those configurations and structures where the conductors are overmolded by, formed into or otherwise secured to the mounting surface, and that all such variants are deemed to be within the scope of the present invention, so long as they provide an accessible portion of the electric current flowpath, where such flowpaths include those structures (such as cables, strips and related electric current-carrying members) that form efficient conduit for the conveyance of electric current in a manner generally similar to tubular flowpaths used to convey flowing liquids.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
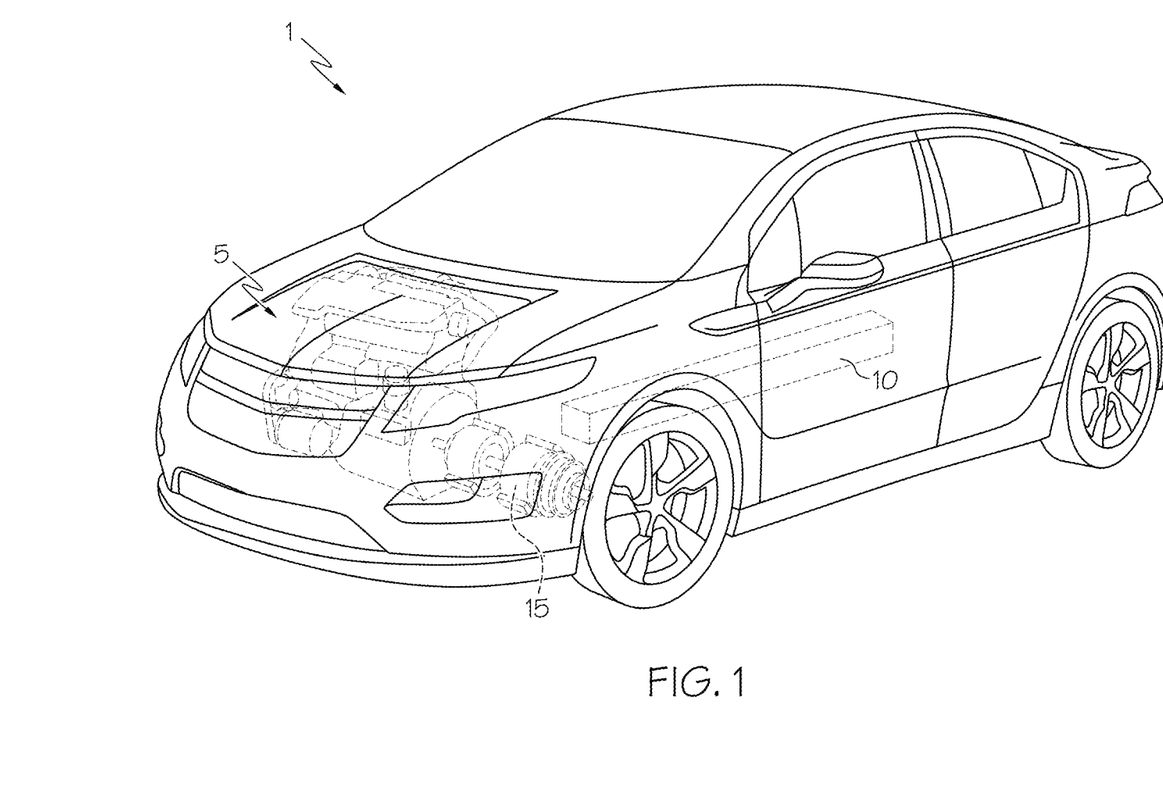
FIG. 1 shows a vehicle with a hybrid propulsion system in the form of a battery pack and an internal combustion engine.

Referring first to FIG. 1, a vehicle 1 includes a hybrid propulsion system in the form of an electric power source made up of a conventional ICE 5 and a notional battery pack 10, both cooperative with one or more electric motors and transmission (for example, in the form of a planetary gear set) that makes up a drivetrain 15. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. As discussed elsewhere in the present disclosure, battery pack 10 may either be in the power battery pack or energy battery pack form, the particular variant becoming apparent from the context. Additional drivetrain components (none of which are shown) useful in providing propulsive power to one or more of the wheels and coupled to one or both of the battery pack 10 and ICE 5 are understood to include rotating shafts, axles, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

Figure 2A:
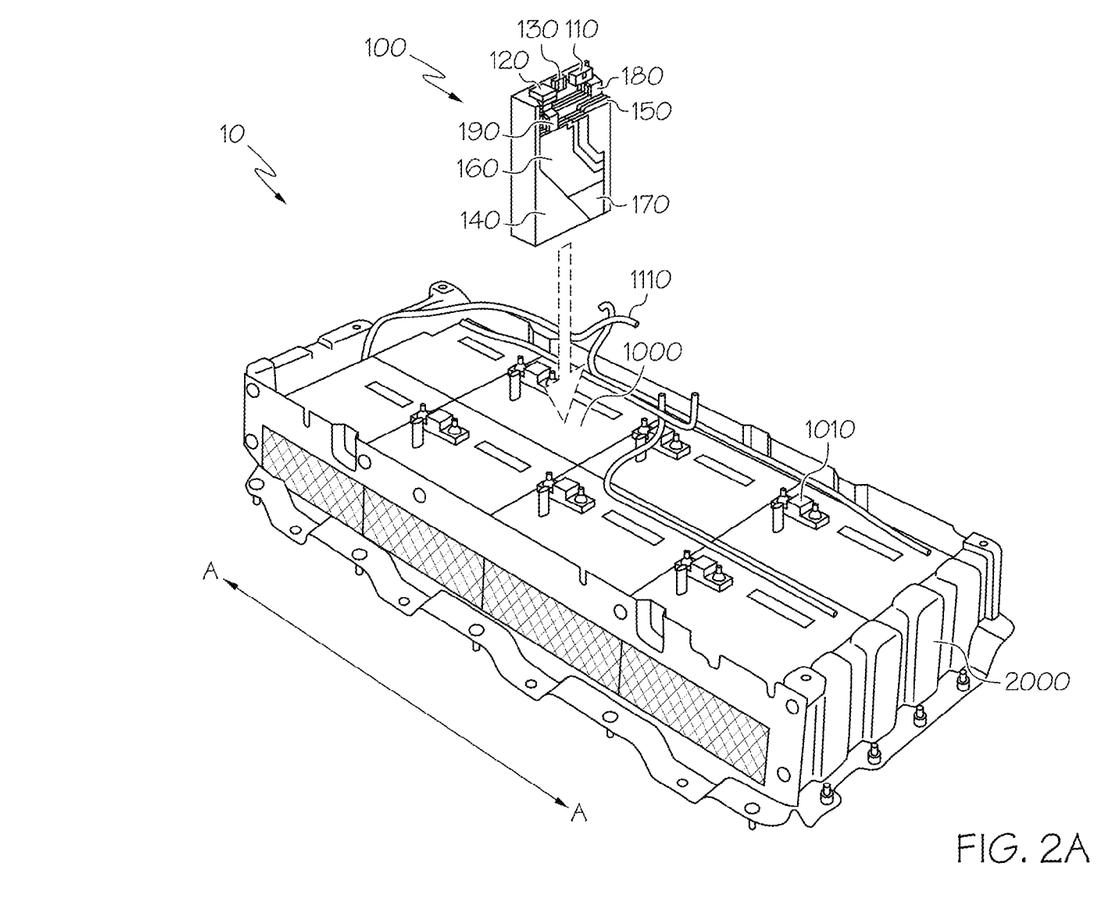
FIG. 2A shows details associated with an individual prismatic can battery cell, as well as its placement within a notional power battery pack.

Referring next to FIG. 2A, an electric current source in the form of a representative prismatic can lithium-ion battery cell 100 is shown, as well as its placement within a eight-module power battery form of the notional battery pack 10. Unlike the pouch-style battery cell variants (which are discussed below in conjunction with FIG. 2B), which— although they have in common a generally flat, rectangular stackable shape in a manner generally similar to a prismatic cell—include numerous cells interspersed with cooling plates and other components, as well as thin peripheral edge and even thinner conductive foil tabs extending from the pouch edge, the prismatic cell 100 has the anode and cathode packaged within a welded rigid metal (for example, aluminum) rectangular canister, enclosure or similar self-supporting housing. As shown, these prismatic can-style cells 100 can be placed in a facing arrangement (much like a deck of cards) along a stacking axis A-A formed by the aligned parallel plate-like surfaces. By connecting them in a particular form (for example, to include some parallel connections), the current produced by each can be increased to meet the high current requirements of the motor 15 or related load. In the present context, high current is considered to be above about 20 amps rms in general, to distinguish over those low current situations where the heat buildup due to resistance at an electrical joint or related connection is not likely to produce heat sufficient to melt or otherwise damage adjacent components.

Shown in a partial cutaway view, the notional construction of cell 100 that is usable with the present invention includes positive and negative terminals 110, 120 projecting out of its top edge, along with a safety vent 130. These positive and negative terminals 110, 120 are laterally-spaced from one another relative to the stacking axis and act as electrical contacts for connection (via busbar, not shown) to an outside load or circuit. Within the cell's 100 rigid outer case 140 are numerous positive and negative electrodes 150, 160 and non-conductive interspersed separators 170. Leads (in the form of tabs 180, 190) from each of the electrodes 150, 160 are gathered together inside the cell case 140 to feed the respective terminals 110, 120.

In the present embodiment, a group of numerous individual cells 100 are stacked within modules 1000 that are in turn placed with an enclosure 1100 that includes a cover (not shown), battery interface unit (not shown) that includes (among other things) cell monitoring circuitry or the like. The battery interface unit may be used in conjunction with various other pieces of electronic equipment (not shown) that can be mounted within the enclosure that defines battery pack 10; such equipment may include (among others) a battery system monitor (BSM) unit and a manual service disconnect (MSD) unit, as well as the aforementioned BDU. Pack 10 defines a generally rectangular profile to accommodate one or more rows of the stacked, aligned cells 100. Busbars (not presently shown) and busbar connectors 1010 (of which six are presently shown) establish short-distance electrical connection between adjacent modules 1000, while bus cables 1110 are used for long-distance electrical connection of the pack 10 to loads within the vehicle 1.

Figure 2B:
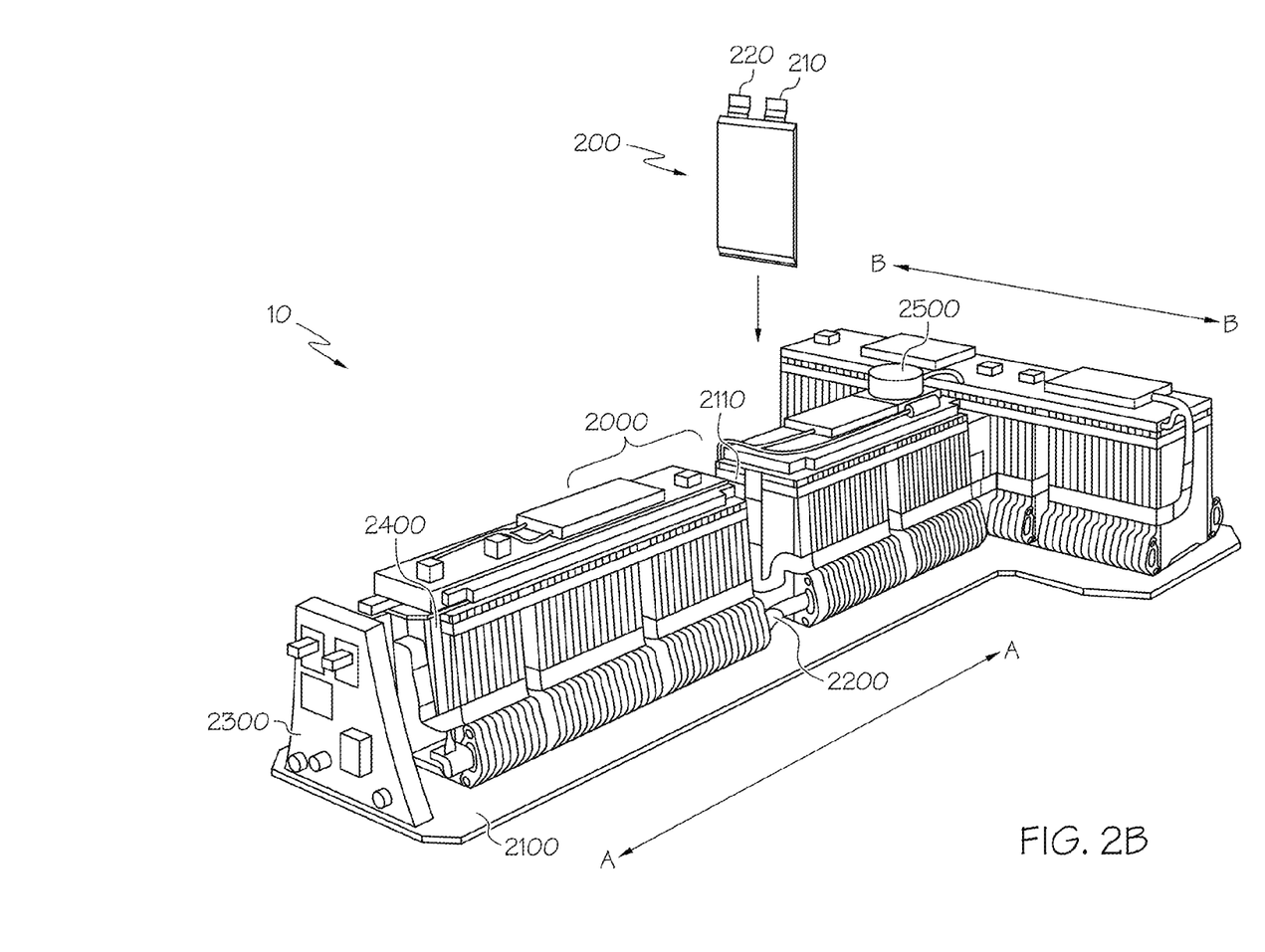
FIG. 2B shows details associated with an individual prismatic pouch battery cell, as well as its placement within a notional energy battery pack.

Referring next to FIG. 2B, a representative prismatic lithium-ion battery pouch cell 200 is shown with positive and negative terminals (or tabs) 210, 220 projecting out of its top edge, as well as its placement within a nine-module energy battery form of the notional battery pack 10. In one non-limiting configuration, the pouch cell 200 defines a stack type of internal electrode structure that is encased within a flexible outer layer that in one form is made of an aluminum foil with a protective polymer coating. Within these outer layers, a number of sheet-shaped positive carbon-based electrodes (cathodes, not shown) are connected to the positive tab 210 and a number of sheet-shaped negative manganese-based storage electrodes (anodes, not shown) are connected to negative tab 220. An electrolyte (not shown) provides a porous medium for the transfer of the electrical charge ions from the storage anode to be chemically bound at the cathode, while also acting as an insulator or separator between each of the electrodes.

Numerous battery cells 200 may be formed along stacking axes A-A and B-B into one of the nine modules 2000 that are supported by a common tray 2100 that can also act as support for coolant hoses 2200 that can be used in configurations where supplemental cooling may be desired. A bulkhead 2300 may define a primary support structure that can function as an interface for the coolant hoses 2200, as well as house a BDU (not shown) in the event battery service is required. In addition to providing support for the numerous battery modules 2000, tray 2100 and bulkhead 2300 may support other modules, such as a voltage, current and temperature measuring module (VITM) 2400 (which acts as a centralized "brain" to aggregate the individual cell voltage information via local network (not shown)). A separate voltage and temperature module (VTSM (not shown)) may be made to sit atop each of the three main battery sections that make up the T-shaped pack 10 to communicate cell voltages to the VITM 2400. Other features, such as manual service disconnect 2500, insulation and a cover (neither of which are shown) complete the battery pack 10. As with the embodiment depicted in FIG. 2A, bus cables 2110 are used for long-distance electrical connection of the pack 10 to loads within the vehicle 1. Packs 10 with greater or fewer modules 2000 are also deemed to be within the scope of the present invention, depending on the size constraints and electrical power needs of the vehicle 1.

Figure 3A:
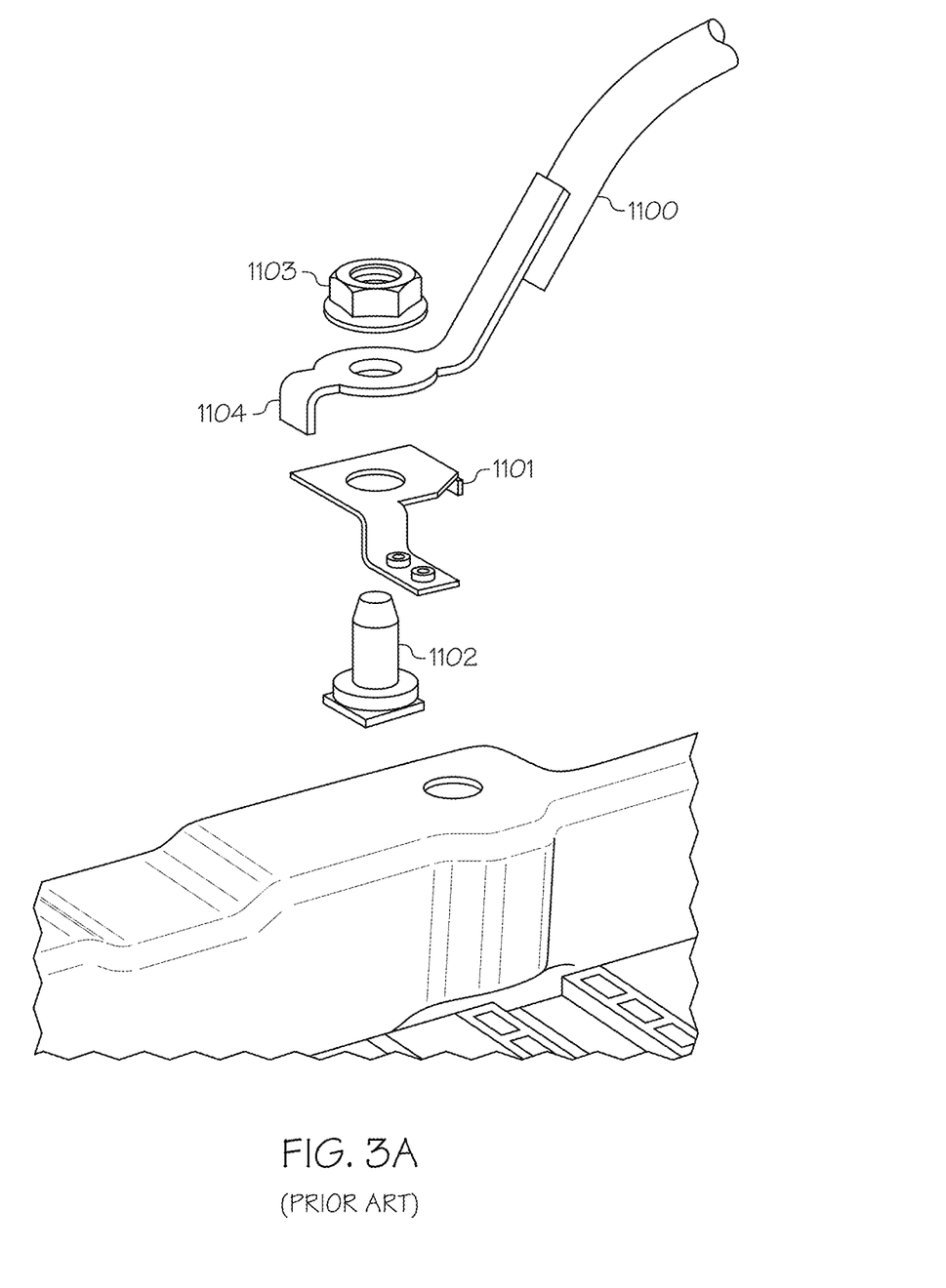
FIG. 3A shows a detail view of a typical joint connection according to the prior art for the power battery of FIG. 2A.
Figure 3B:
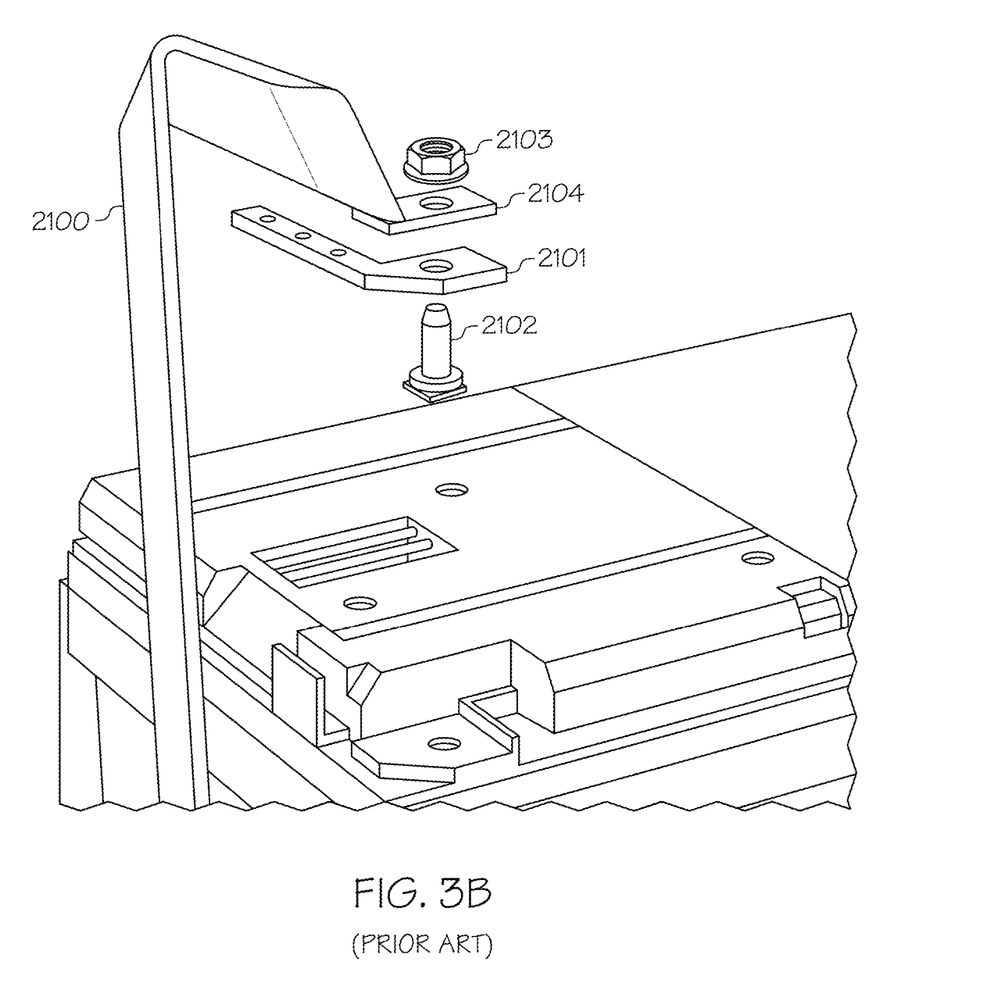
FIG. 3B shows a detail view of a typical joint connection according to the prior art for the energy battery of FIG. 2B.

Referring next to FIGS. 3A and 3B, prior art assemblies showing the establishment of electrical connection within the power and energy battery forms of FIGS. 2A and 2B is shown. In the first (power battery) variant of FIG. 3A, an electrically-conductive busbar 1101 has an aperture formed in it to accept an upwardly-protruding (and in one form, electrically-conductive) stud 1102 that can be used to secure the busbar 1101 and cable 1100 to one another through threaded nut 1103 and a ring terminal 1104. The joint formed by the combination of stud 1102, nut 1103 and busbar 1101 permits the flow of electric current from the battery terminals (not presently shown) to a suitable load (such as electric motor 15 of FIG. 1). As mentioned above, an electrical connection is established as long as the stud 1102 and busbar 1101 are contacting one another, even if the nut 1103 is either missing or improperly secured, such as through cross-threading or an inadequate degree of tightening (the latter of which is preferably between about 8.5 Nm and 10.5 Nm of dynamic torque (for initial builds) or static torque (for service or repair)). Such incidental electrical connection is difficult to detect, and can lead to increased joint electrical resistance that can lead to a significant localized generation of heat.

In the second (energy battery) variant of FIG. 3B, an electrically-conductive busbar 2101 has an aperture formed in it to accept an upwardly-protruding (and in one form, electrically-conductive) stud 2102 that can be used to secure the busbar 2101 and bus cable 2100 (which in one preferred form defines a laminated construction) to one another through threaded nut 2103 and a ring terminal 2104. Regardless of the battery variants, the various components discussed above—the stud, nut, busbar and its connector and ring terminals—that are used to establish electrical connectivity are made from conductive metals (such as copper) and may include nickel or tin electroplating, flashing or related coating, as well as surface finishing or passivation layers.

Figure 4:
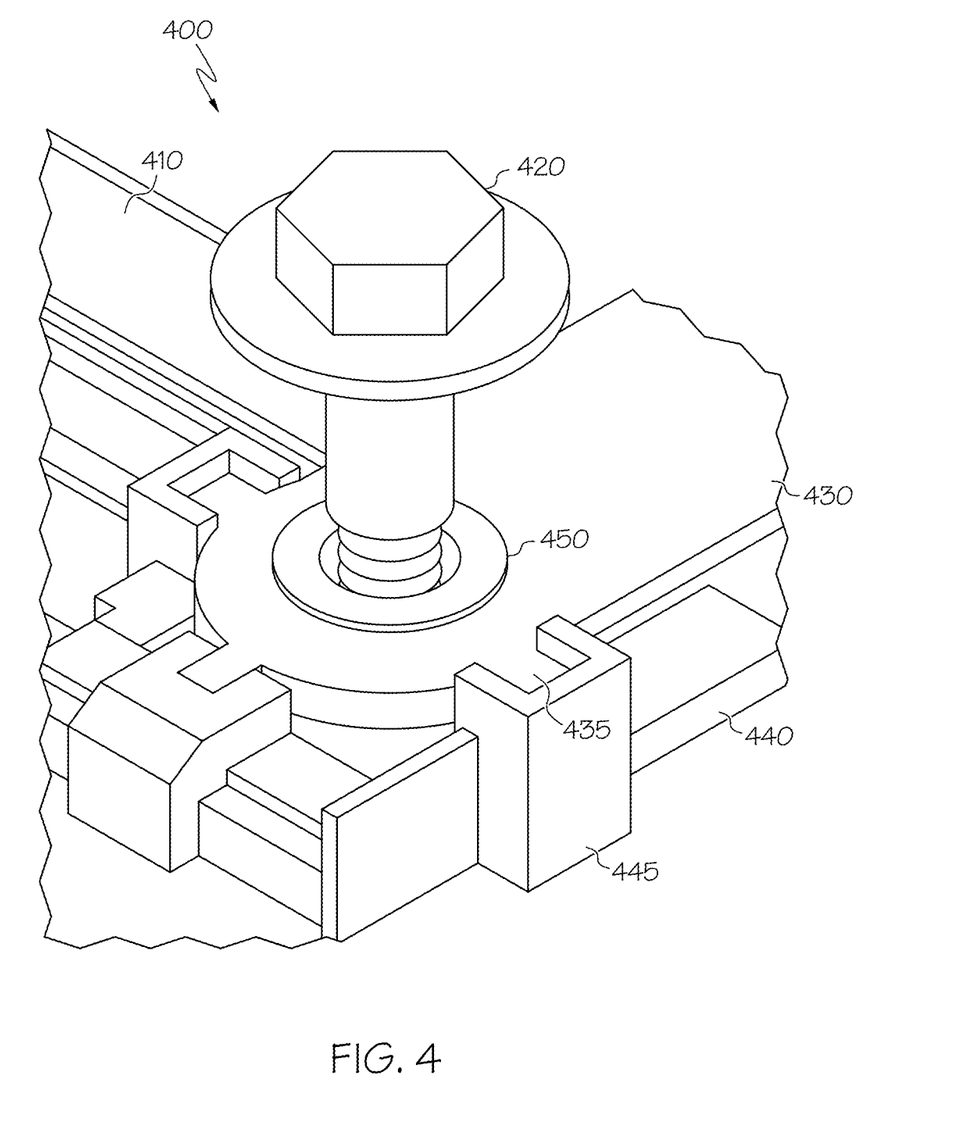
FIG. 4 shows a detail view of an electrical joint connection according to an aspect of the present invention.
Figure 5A:
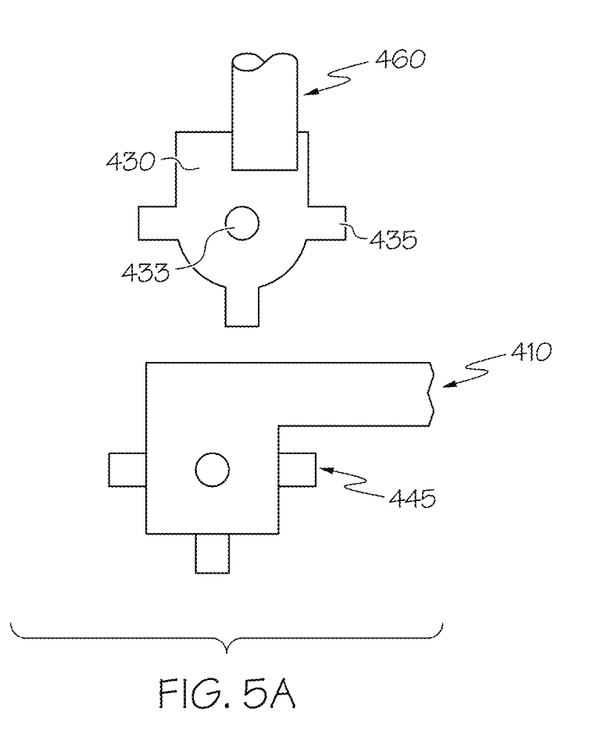
FIGS. 5A and 5B shows a more detailed top-down view (FIG. 5A) and elevation view (FIG. 5B) of the components used in the electrical joint connection of FIG. 4.
Figure 5B:
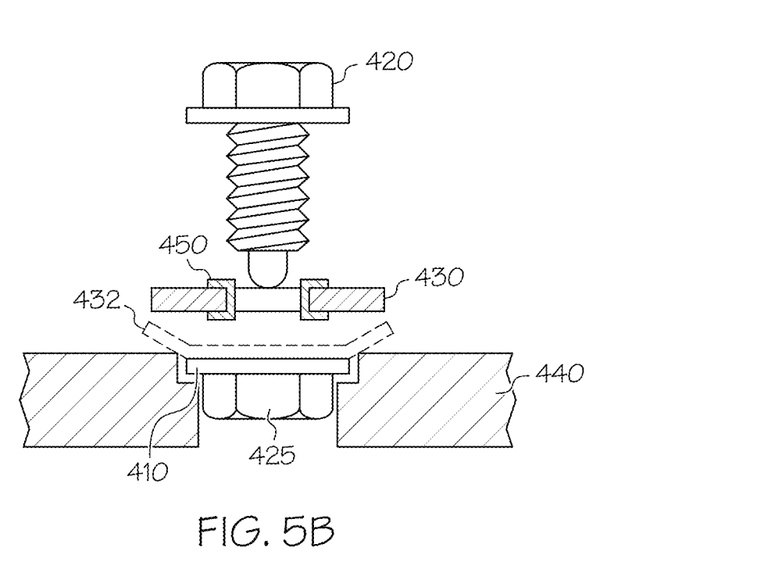

Referring next to FIGS. 4, 5A and 5B, components in the form of an assembly 400 used to establish electrical connection between the various battery cells 100 (for power battery pack variants) or 200 (for energy battery pack variants) and the motor 15 (or related load) according to an embodiment of the present invention is shown. Significantly, the present invention eliminates the permanent, fixed studs 1102, 2102 discussed above and instead uses the fastener to promote a deformed cooperation between joined conductors, while nonconductive components placed in, on or around the termination point of the respective conductors keep electrical connectivity (as well as the attendant potential for incidental or partial contact) from being formed between these two conductors until such time as the fastener imparts a force sufficient to establish such deformed cooperation in the region adjacent the joint. More significantly, assembly 400 satisfies a need for a low resistance electrical joint by establishing a high normal force and relatively large amount of surface contact area between two electrically joined surfaces.

Assembly 400 includes at least a first conductor 410, a fastener 420 and a second conductor 430. In one form, the first conductor 410 may be a strip (commonly referred to as a J-bar) of metal (for example, copper) or other electrical conductor coming from the various positive and negative battery terminals of the cells 100, 200. Furthermore, the second conductor 430 preferably leads to (or makes up a part of) a busbar that permits module-to-module coupling. Although not shown, a similar joint may be formed for bus cables 460 (similar to that shown in FIGS. 2A, 2B, 3A and 3B) to deliver at least the majority of current between the battery pack 10 and the motor 15 or other load. The first conductor 410 may define a generally flat, rectangular strip that can be sized to fit within integrally-formed channels that constitute a mounting surface formed in the top of a battery pack cover 440. In a preferred form, the battery pack cover 440 (which forms the top part of the overall enclosure) is made from a substantially electrically nonconductive material, such as a plastic. In various forms, the places where the battery pack cover 440 joins to the first conductor 410 may be through overmolding, snap-fit connection, adhesives or fastening (the last through riveting, bolting or the like).

Likewise, the mounting surface of the battery pack cover 440 can include additional component shapes formed therein so that it and the second conductor 430 can define a registered fit between them. In one form, this may include shaped members made from a plastic or other nonconductive material such that the termination points that define the joined part of the conductors 410 and 430 are encased in complementary-shaped components; in one form, the components may include recesses, slots, tabs, bosses 445 or related structure formed in the mounting surface in order to provide joint guide features. As such, these covers at the termination points may form part of (or at least be contact with) the electrically nonconductive mounting surface(s). Significantly, the termination point of the second conductor 430 includes a nonconductive (for example, plastic) cover, overmolding or the like that is used to ensure that it inhibits direct electrical contact between the electrically-conductive termination points of the first and second conductors 410, 430 until the fastener 420 is driven into joint-forming place. FIG. 4 also shows with particularity how the buildup of nonconductive material surrounding the termination points of the two conductors 410, 430 can be sized and shaped to provide anti rotation features. In particular, complementary-shaped tabs 435 or similar projections may be formed in the covering or related nonconducting portion of the second conductor 430 so that the tabs 435 fit within the space formed in the nonconducting bosses 445; in addition to helping to ensure proper securing angles between these components, the registered fit can help ensure that contact between one surface of the second conductor 430 and an adjacent surface of the first conductor is avoided until such time as the fastener is tightened, as well as promote anti-rotation features between the joined conductors 410, 430. In one form, the interference produced between the tabs 435 and the bosses 445 also helps prevent a "bottoming out" contact between the joined conductors 410, 430 until a significant normal force is applied by the fastener 420 as a way to deflect the tabs 435.

As mentioned above, electrical contact between the first and second conductors 410, 430 is only established when the fastener 420 is secured to both in such a way that deformable portions of one or both respond to the tightening or securing action of the fastener 420. In one preferred form, such deformation may be within the elastic range such that upon removal of the force imparted by the fastener 420, the effected conductor (shown in the figures as the first conductor 410) springs back into its unloaded shape. As shown with particularity in FIG. 5B, the deformable portion 432 of the second conductor 430 is that portion that adjacently surrounds an aperture 433 formed therein. The spacing between the two conductors 410, 430 is such that until the clamping force of the fastener 420 (which may include a separate nut 425) is sufficient to overcome the resistance of the deformable portion 432 and force it to assume the trough-shaped seating (defined on the bottom by an upper surface of the first conductor 410 and on the sides by the upstanding walls of the mounting surface formed in the top of a battery pack cover 440), incidental electrical contact between them is avoided.

An insulative sleeve 450 (such as a grommet) may be placed into the aperture that is formed in the second conductor 430 (as well as in the nonconductive covering at the termination point) to redundantly avoid electrical contact between it and the first conductor 410 until the fastener 420 is secured to both to a degree sufficient to ensure the deformation and concomitant seating between the two, as shown in the dashed-line portion of the second conductor 430 of FIG. 5B. This is significant in that it precludes the formation of an unintentional or incidental electrical contact in situations where the fastener 420 is either misapplied or only applied with temporary (i.e., hand-tight) force. For purposes of the joint function (where high normal forces and substantial adjacent surface area contact are paramount), the electron transfer (i.e., the electrical energy flowpath) takes place at the flat-to-flat contact between the mating surfaces of the first and second conductors 410 and 430; in this way, while the electric joint is not possible without the clamping or related securing movement of the fastener 420, the fastener 420 is not considered part of the electric joint per se. Importantly, the fastener 420 avoids having to form the joint from plastic materials, where low current carrying capability or reliance upon a complex system of springs to maintain contact between the mating surfaces is required. Thus, in a preferred form, the fastener 420 is made from a steel (for example, a stainless steel) to achieve the necessary strength for maintaining a stable joint; that it is made of an electrically conductive material is not critical. As such, it could be made from a ceramic, plastic, composite or other electrically nonconductive material so long as its strength and long term stability (for example, fatigue) properties were sufficient for extended periods of operation. In the present context, terms such as "insulative", "nonconductive" or the like are meant to convey the same general idea that by virtue of the material makeup of their component referent, the flow of electric current associated with normal battery pack 10 operation for automotive purposes is inhibited. Although not shown, fastener 420 may define a groove in its head portion to help for installation clearance.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A high current electrical connection assembly comprising:
   a first conductor in electric current communication with at least one current source;
   a fastener; and
   a second conductor in electric current communication with at least one current load, and having a plurality of radial tabs, wherein a spacing between said first and second conductors is configured such that an electrical joint between the first and second conductors is only established when said fastener is secured to the first and second conductors with a force sufficient to deform the radial tabs and thereby cause the second conductor to assume a trough-shaped configuration.

2. The assembly of claim 1, further comprising an electrically nonconductive mounting surface configured to accept said first and second conductors and said fastener thereon.

3. The assembly of claim 2, wherein said first conductor is coupled to said mounting surface through an overmolded fit between them.

4. The assembly of claim 2, wherein said mounting surface and said second conductor are shaped to define a registered fit therebetween.

5. The assembly of claim 1, wherein at least one of said mounting surface and said first and second conductors define an aperture therein through which said fastener is selectively received.

6. The assembly of claim 5, wherein the portion of said second conductor that defines said aperture forms at least a portion of said deformable shape.

7. The assembly of claim 6, further comprising an insulative sleeve cooperative with said aperture in said second conductor to redundantly avoid electrical contact between said first and second conductors until said fastener is secured to both to impart said elastically deformable shape.

8. The assembly of claim 1, wherein said first conductor that defines a flowpath from at least one battery cell to said joint and said second conductor defines a flowpath from said joint to an electric motor.

9. The assembly of claim 1, wherein said electrical joint between said first and second conductors defines a substantially face-to-face contact therebetween.

10. The assembly of claim 9, wherein a contact resistance at said substantially face-to-face contact is no more than about 0.015 milliohms.

11. An automotive battery pack comprising:
a plurality of battery cells;
an enclosure disposed around said cells; and
an electrical connection assembly formed on said enclosure, said assembly comprising:
- a first conductor placed in electric current communication with at least one of said cells;
- a fastener;
- a second conductor in electric current communication with at least one current load, and having a plurality of radial tabs, wherein a spacing between said first and second conductors configured is such that electrical contact between the first and second conductors is only established when said fastener is secured to the first and second conductors with a force sufficient to deform the radial tabs and thereby cause the second conductor to assume a trough-shaped configuration.

12. The battery pack of claim 11, wherein at least a portion of said enclosure where said electrical contact between said first and second conductors is established comprises an electrically nonconductive material.

13. The battery pack of claim 11, further comprising an insulative sleeve disposed within an aperture formed in at least one of said first and second conductors to redundantly avoid electrical contact between them until said fastener is secured to both to impart said deformable shape.

14. The battery pack of claim 11, further comprising at least one insulative boss formed on at least one of said second conductor and a portion of said enclosure adjacent said second conductor.

15. The battery pack of claim 11, wherein said deformable shape comprises an elastically deformable shape.

16. A method of making an electrical joint between a high current source and a high current load, said method comprising:
- electrically coupling said source to a first conductor that defines a first conductive flowpath;
- electrically coupling said load to a second conductor spaced from the first conductor, that defines a second conductive flowpath, and that has a plurality of radial tabs; and
- using a fastener to deform the radial tabs and thereby cause the second conductor to assume a trough-shaped configuration and thereby form an electrical joint between the first and second conductors.

17. The method of claim 16, wherein said high current source comprises an automotive battery pack and said high current load comprises an electric motor.

18. The method of claim 16, wherein deformation comprises elastic deformation.

19. The method of claim 16, further comprising arranging an electrically nonconductive sleeve to be disposed within an aperture formed in at least one of said first and second conductors.

20. The method of claim 16, wherein said electrical joint between said first and second conductors defines a substantially face-to-face contact therebetween with a contact resistance of no more than about 0.015 milliohms.

* * * * *